United States Patent
Iwai et al.

(10) Patent No.: US 9,591,526 B2
(45) Date of Patent: Mar. 7, 2017

(54) COMMUNICATION CONTROL SYSTEM, SERVICE MANAGEMENT SERVER, MOBILE STATION, COMMUNICATION CONTROL METHOD, AND NON-TRANSITORY COMPUTER READABLE MEDIUM

(71) Applicant: NEC Corporation, Tokyo (JP)

(72) Inventors: Takanori Iwai, Tokyo (JP); Ko Ito, Tokyo (JP); Shunsuke Maeda, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 14/647,320

(22) PCT Filed: Sep. 25, 2013

(86) PCT No.: PCT/JP2013/005677
§ 371 (c)(1),
(2) Date: May 26, 2015

(87) PCT Pub. No.: WO2014/083735
PCT Pub. Date: Jun. 5, 2014

(65) Prior Publication Data
US 2015/0304887 A1 Oct. 22, 2015

(30) Foreign Application Priority Data
Nov. 29, 2012 (JP) .................................. 2012-260719

(51) Int. Cl.
*H04W 28/08* (2009.01)
*H04W 48/04* (2009.01)
(Continued)

(52) U.S. Cl.
CPC ........... *H04W 28/08* (2013.01); *H04W 24/02* (2013.01); *H04W 48/04* (2013.01); *H04W 64/00* (2013.01); *H04W 76/04* (2013.01)

(58) Field of Classification Search
CPC combination set(s) only.
See application file for complete search history.

(56) References Cited

U.S. PATENT DOCUMENTS

| | | | |
|---|---|---|---|
| 2004/0121769 A1* | 6/2004 | Aoki | H04W 8/04 455/435.1 |
| 2004/0127217 A1 | 7/2004 | Aoki et al. | |

(Continued)

FOREIGN PATENT DOCUMENTS

| | | |
|---|---|---|
| EP | 1397012 A2 | 3/2004 |
| EP | 2044737 B1 | 9/2012 |

(Continued)

OTHER PUBLICATIONS

International Search Report corresponding to PCT/JP2013/005677, 2 pages, mail date Dec. 17, 2013.

(Continued)

*Primary Examiner* — Kabir A Timory
(74) *Attorney, Agent, or Firm* — Wilmer Cutler Pickering Hale and Dorr LLP (57) ABSTRACT

An object is to provide a communication control system, a service management server, a mobile station, a communication control method, and a program, with which the processing load of a network apparatus can be reduced in the case where a great number of communication apparatuses are concentrated. A communication control system of the present invention includes a mobile station concentration prediction unit (10) that predicts an area where a plurality of mobile stations (31) to (34) will be densely concentrated by movement of the plurality of mobile stations (31) to (34), and a communication timing control unit (20) that determines a mobile station to be a communication timing controlled target out of the plurality of mobile stations (31) to (34) predicted to be densely concentrated in the area, and (Continued)

controls the communication timing of the determined mobile station.

17 Claims, 8 Drawing Sheets

(51) Int. Cl.
  *H04W 76/04*    (2009.01)
  *H04W 64/00*    (2009.01)
  *H04W 24/02*    (2009.01)

(56) References Cited

U.S. PATENT DOCUMENTS

| | | |
|---|---|---|
| 2007/0293235 A1 | 12/2007 | Inayoshi et al. |
| 2008/0013462 A1 | 1/2008 | Ye et al. |
| 2009/0286526 A1 | 11/2009 | Matsunaga |
| 2012/0087260 A1 | 4/2012 | Devarapalli et al. |
| 2013/0155864 A1 | 6/2013 | Yoshizawa et al. |
| 2013/0155994 A1 | 6/2013 | Yoshizawa et al. |
| 2013/0190025 A1 | 7/2013 | Sakata |
| 2013/0329552 A1 | 12/2013 | Carnero Ros et al. |

FOREIGN PATENT DOCUMENTS

| | | |
|---|---|---|
| EP | 2624604 A1 | 8/2013 |
| JP | 2004/096621 | 3/2004 |
| JP | 2007/336326 | 12/2007 |
| JP | 2012/070324 | 4/2012 |
| JP | 2012/085011 | 4/2012 |
| WO | WO-2012/043067 | 4/2012 |
| WO | WO-2012/046507 | 4/2012 |
| WO | WO-2012/046512 A1 | 4/2012 |
| WO | WO-2012/131424 A1 | 10/2012 |

OTHER PUBLICATIONS

3GPP TR 22.888 V0.7.0 (May 7, 2012), 3rd Generation Partnership Project; Technical Specification Group Services and System Aspects; Study on Enhancements for MTC; (Release 11), pp. 1-23.
Extended European Search Report issued by the European Patent Office for Application No. 13858458.6 dated Jun. 24, 2016 (8 pages).

* cited by examiner

COMMUNICATION CONTROL SYSTEM, SERVICE MANAGEMENT SERVER, MOBILE STATION, COMMUNICATION CONTROL METHOD, AND NON-TRANSITORY COMPUTER READABLE MEDIUM

CROSS-REFERENCE TO RELATED APPLICATIONS

This application is a national stage application of International Application No. PCT/JP2013/005677 entitled "COMMUNICATION CONTROL SYSTEM, SERVICE MANAGEMENT SERVER, MOBILE STATION, COMMUNICATION CONTROL METHOD, AND NON-TRANSITORY COMPUTER READABLE MEDIUM," filed on Sep. 25, 2013, which claims the benefit of the priority of Japanese Patent Application No. 2012-260719, filed on Nov. 29, 2012, the disclosures of each of which are hereby incorporated by reference in their entirety.

TECHNICAL FIELD

The present invention relates to a communication control system, a service management server, a mobile station, a communication control method, and a program.

BACKGROUND ART

In recent years, there has been a rapid proliferation of mobile phones. In some cases, a single person owns a plurality of mobile phones. Further, mobile phones are not only carried by persons. That is, a chip having a communication function is also attached to a pet, or a communication function is installed in a machine apparatus or the like, to carry out communication with the pet or the machine apparatus. Further, a service of attaching a chip or the like having a communication function to an item to be delivered, to thereby monitor the current location of the item, is also provided. In general, a forwarding agent gathers items to be delivered to a collection point or the like, and delivers each item from the collection point to a delivery destination. In such a case, a great number of items are collected at the collection point. Further, since the items can be stacked, the number of chips per unit area largely increases.

CITATION LIST

Non Patent Literature

Non Patent Literature 1: 3GPP TR 22.888 V0.7.0 (2012 May) Study on Enhancements for MTC (Release 11)

SUMMARY OF INVENTION

Technical Problem

Concentration of a great number of communication apparatuses at a particular place is discussed in Non Patent Literature 1. That is, when items or the like to each of which a chip having a communication function is attached are gathered, the number of communication apparatuses communicating with a base station may exceed the number of allowed connections of the base station. In such a case, there arise problems such as an increase in processing load of the base station, or an increase in the number of communication apparatuses failing to communicate.

In order to solve such problems, an object of the present invention is to provide a communication control system, a service management server, a mobile station, a communication control method, and a program by which the processing load of a network apparatus can be reduced in the case where a great number of communication apparatuses are concentrated.

Solution to Problem

A communication control system according to a first aspect of the present invention includes mobile station concentration prediction means for predicting an area where a plurality of mobile stations will be densely concentrated by movement of the plurality of mobile stations, and communication timing control means for determining a mobile station to be a communication timing controlled target out of the plurality of mobile stations predicted to be densely located in the area, and controlling communication timing of the determined mobile station.

A service management server according to a second aspect of the present invention is arranged between a network apparatus arranged in a mobile communication network and an application server arranged in an external communication network. The service management server includes a mobile station concentration prediction unit that predicts an area where a plurality of mobile stations will be densely concentrated by movement of the plurality of mobile stations, and a communication timing control unit that determines a mobile station to be a communication timing controlled target out of the plurality of mobile stations predicted to be densely concentrated in the area, and controls communication timing of the determined mobile station.

A mobile station according to a third aspect of the present invention receives a terminal control request message transmitted from a service management server that predicts an area where a plurality of mobile stations will be densely concentrated by movement of the plurality of mobile stations. The service management server determines a mobile station to be a communication timing controlled target out of the plurality of mobile stations predicted to be densely concentrated in the area. The service management server controls communication timing of the determined mobile station. The mobile station changes the communication timing based on the terminal control request message.

A communication control method according to a fourth aspect of the present invention includes: predicting an area where a plurality of mobile stations will be densely concentrated by movement of the plurality of mobile stations; determining a mobile station to be a communication timing controlled target out of the plurality of mobile stations predicted to be densely concentrated in the area; and controlling communication timing of the determined mobile station.

A program according to a fifth aspect of the present invention causes a computer to execute the steps of: predicting an area where a plurality of mobile stations will be densely concentrated by movement of the plurality of mobile stations; determining a mobile station to be a communication timing controlled target out of the plurality of mobile stations predicted to be densely concentrated in the area; and controlling communication timing of the determined mobile station.

Advantageous Effects of Invention

The present invention can provide a communication control system, a service management server, a mobile station, a communication control method, and a program by which the processing load of a network apparatus can be reduced in the case where a great number of communication apparatuses are concentrated.

DESCRIPTION OF EMBODIMENTS

First Embodiment

Figure 1:
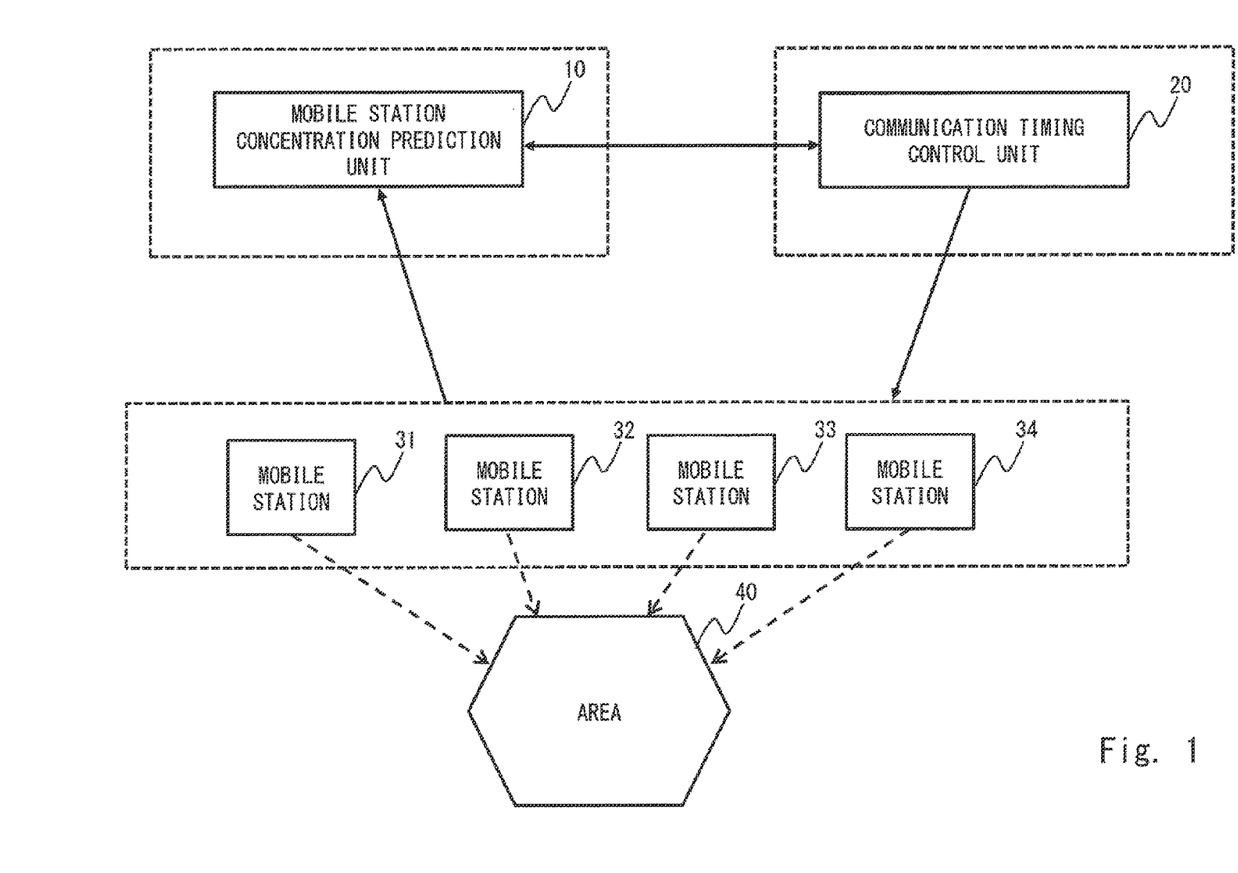
FIG. 1 is a configuration diagram of a communication control system according to a first embodiment.

In the following, with reference to the drawings, a description will be given of embodiments of the present invention. Firstly, with reference to FIG. 1, a description will be given of an exemplary configuration of a communication control system according to a first embodiment of the present invention. The communication control system shown in FIG. 1 includes an apparatus including a mobile station concentration prediction unit 10, an apparatus including a communication timing control unit 20, and mobile stations 31 to 34. The apparatus including the mobile station concentration prediction unit 10 and the apparatus including the communication timing control unit 20 may each be a server apparatus or the like. Note that, though FIG. 1 shows an example where the mobile station concentration prediction unit 10 and the communication timing control unit 20 are arranged in separate apparatuses, a single server apparatus may include the mobile station concentration prediction unit 10 and the communication timing control unit 20. The mobile station concentration prediction unit 10 and the communication timing control unit 20 may be included in an application server arranged in an external communication network different from the mobile communication network, or may be included in a service management server arranged among apparatuses in the mobile communication network. Further, FIG. 1 shows the manner in which the mobile stations 31 to 34 move into an area 40.

The mobile station concentration prediction unit 10 predicts the area where a plurality of mobile stations will be densely concentrated, by movement of a plurality of mobile stations 31 to 34. In the example of FIG. 1, the mobile station concentration prediction unit 10 predicts the area 40 as the area where a plurality of mobile stations will be densely concentrated.

The communication timing control unit 20 determines, out of a plurality of mobile stations that are predicted to be densely concentrated in a particular area, a mobile station to be a communication timing controlled target. In the example of FIG. 1, the mobile station to be a communication timing controlled target may be the mobile stations 31 to 34, or may be an arbitrary number of mobile stations selected from the mobile stations 31 to 34.

The mobile stations 31 to 34 may each be a mobile phone terminal, a smartphone terminal, a tablet-type terminal, a personal computer having a communication function or the like. Alternatively, the mobile stations 31 to 34 may each be an object or an apparatus to which a chip having a communication function is attached. Further, the area 40 may be a cell or a sector formed by a base station arranged in the mobile communication network, or it may be an area formed by an AP (access point) arranged in a wireless LAN (Local Area Network) network.

As described above, the communication control system according to the first embodiment of the present invention can control communication timing of a plurality of mobile stations, even in the case where the plurality of mobile stations are densely concentrated in a particular area. By controlling the communication timing, the communication timing can be varied among the mobile stations. Further, the frequency of the communication performed by the mobile stations can be reduced. For example, by varying the communication timing among the mobile stations, it becomes possible to prevent concentration of communication to an apparatus to which the mobile stations are connected. Further, by reducing the frequency of communication performed by the mobile stations, the processing load of the apparatus to which the mobile stations are connected can be reduced.

Second Embodiment

Figure 2:
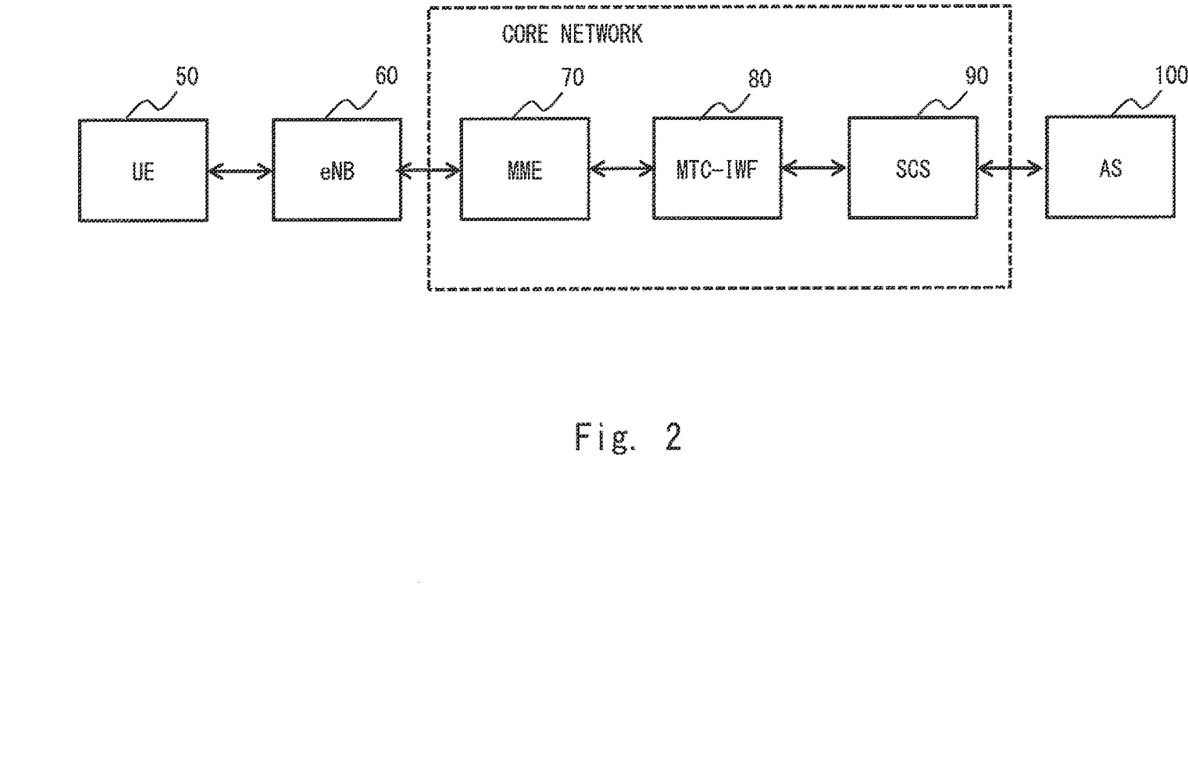
FIG. 2 is a network configuration diagram according to a second embodiment.

Subsequently, with reference to FIG. 2, a description will be given of a network configuration for realizing the communication control system of the present invention. The network shown in FIG. 2 includes a UE (User Equipment) 50, an eNB (evolved NodeB) 60, an MME 70, an MTC-IWF 80, an SCS 90, and an AS (Application Server) 100. The eNB 60, the MME 70, the MTC-IWF 80, and the SCS 90 are apparatuses that structure the network defined in the 3GPP. The technical specification of the 3GPP defines the functions of the eNB 60, the MME 70, the MTC-IWF 80, and the SCS 90. The MME 70, the MTC-IWF 80, and the SCS 90 structure the core network. Further, the UE 50 is the apparatus name used for indicating each of the mobile stations 31 to 34 in the 3GPP. The AS 100 is an application server that is managed by a business entity different from the mobile network operator. Alternatively, the mobile network operator may manage the AS 100.

The eNB 60 is a base station that operates according to a radio scheme using the LTE (Long Term Evolution). The SCS 90 communicates with the AS 100. That is, the SCS 90 receives a service execution request transmitted from the AS 100, and transmits a service execution request to each of the apparatuses in the mobile communication network including the core network. The MME 70 chiefly performs movement management of the UE 50. The MTC-IWF 80 is used for relaying communication between the eNB 60 as well as the apparatuses structuring the core network, and the SCS 90. Here, the SCS 90 may include the mobile station concentration prediction unit 10 and the communication timing control unit 20 described with reference to FIG. 1. Alternatively, the SCS 90 may include the mobile station concentration prediction unit 10, while the MTC-IWF 80 includes the communication timing control unit 20. Alternatively, the MTC-IWF 80 may include the mobile station concentration prediction unit 10 and the communication timing control unit 20.

The eNB 60 forms a cell or a sector that corresponds to the area 40. The eNB 60 performs communication with the UE 50 located in the formed cell or sector.

Figure 3:
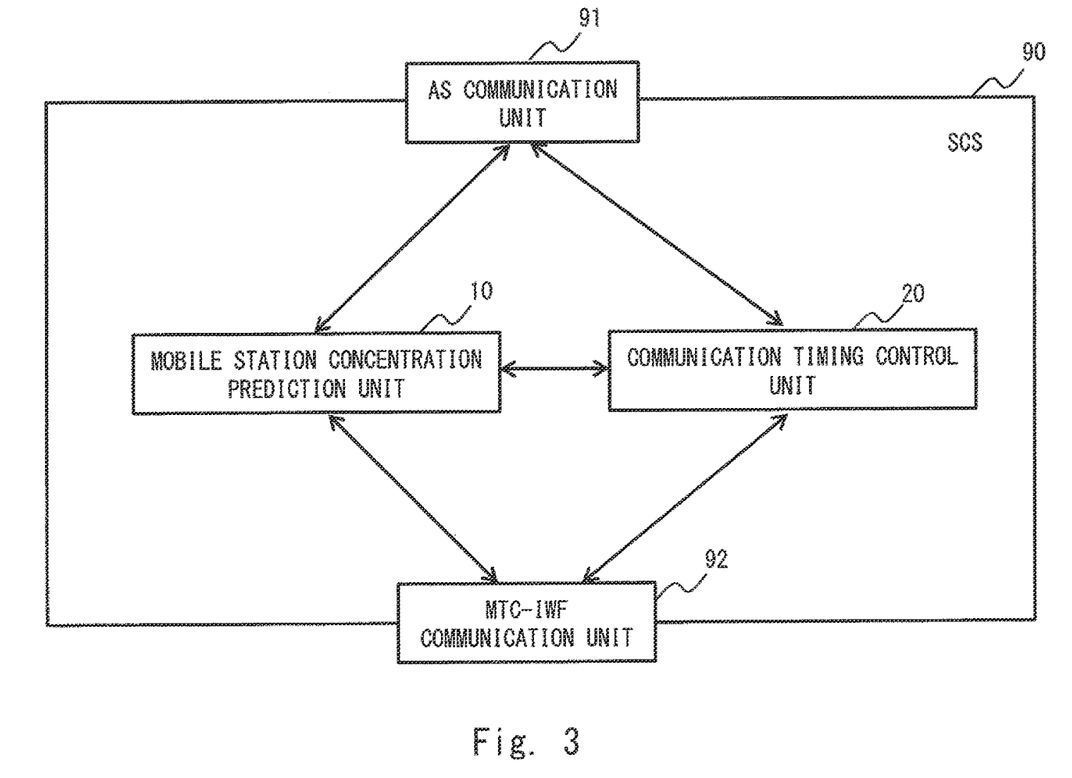
FIG. 3 is a configuration diagram of an SCS according to the second embodiment.

Subsequently, with reference to FIG. 3, a description will be given of an exemplary configuration of the SCS 90 according to a second embodiment of the present invention. The description will be given with reference to FIG. 3, in which identical reference signs are allotted to elements having similar functions to those shown in FIG. 1.

The SCS 90 includes an AS communication unit 91, the mobile station concentration prediction unit 10, the communication timing control unit 20, and an MTC-IWF communication unit 92. The SCS 90 is arranged between the AS 100 and the MTC-IWF 80, and may be referred to as a service management server.

The mobile station concentration prediction unit 10 predicts the area where a plurality of UEs 50 will be densely concentrated. For example, the mobile station concentration prediction unit 10 may periodically acquire location information of a plurality of UEs 50 located in the mobile communication network, and predict the area where a plurality of UEs 50 will be densely concentrated, based on a statistical process of the acquired location information. Specifically, the mobile station concentration prediction unit 10 may calculate the moving direction or moving distance of each UE 50 from the periodically acquired location information. The mobile station concentration prediction unit 10 may estimate, using the calculated moving direction or moving distance of the UEs 50, in which area the plurality of UEs 50 will be densely concentrated after a lapse of a certain time.

Alternatively, the mobile station concentration prediction unit 10 may calculate the number of UEs 50 located in a certain area each certain period, and when the increase rate of the number of UEs 50 located in a certain area exceeds a predetermined threshold value, the mobile station concentration prediction unit 10 may predict that the area will be the area where the plurality of UEs 50 are densely concentrated.

Alternatively, the mobile station concentration prediction unit 10 may predict a certain area is the area where a plurality of UEs 50 are densely concentrated when the number of UEs 50 located in the certain area exceeds a predetermined threshold value.

Here, as described above, the area may be a cell or a sector formed by a base station arranged in the mobile communication network, or it may be an area formed by an AP (access point) arranged in a wireless LAN (Local Area Network) network. Further, the area may be a location registration area (TA) formed by a plurality of cells or sectors arranged in the mobile communication network. When the mobile communication network issues an incoming call notification to any UE 50, the mobile communication network issues an incoming message to a plurality of UEs located in the same TA as the UE 50. Further, in the case where the TA is changed, each UE performs a location registration process on the mobile communication network.

Alternatively, the area may be an area that is specified by an address of map information or the like, or may be an area that is specified by latitude and longitude information or the like.

A plurality of UEs 50 may include a machine terminal in place of mobile phone terminals or the like, as described above. The machine terminal is a terminal or an apparatus that autonomously performs communication without requiring a user's operation. For example, a machine terminal is an object or an apparatus to which a chip having a communication function is attached. Specifically, the machine terminal may be a vending machine whose inventory is managed by remote operations. Alternatively, the machine terminal may be an item to which a chip or the like having a communication function is attached, for the purpose of grasping the current location of the UEs 50 by remote monitoring.

To perform communication autonomously may mean, for example, in the case where a machine terminal is remotely accessed, to transmit a response message without receiving any information input by the user. Alternatively, performing communication autonomously means machine terminal transmitting information that is periodically collected using sensors or the like to a server apparatus or the like via the mobile communication network, without any instruction information input of the user.

Here, a plurality of UEs 50 densely concentrated in an identical area corresponds to, for example, the situation where the agent for delivering items has collected the items, which are regarded as machine terminals, at an area being the delivery center.

Further, a plurality of UEs 50 may be managed on a group-by-group basis. For example, a plurality of machine terminals managed by an identical company or organization may form a single group. A plurality of machine terminals under an identical communication policy, e.g., allowing a certain delay, may form a single group. For example, a plurality of items managed by an identical forwarding agent may be machine terminals that are managed as a single group.

The communication timing control unit 20 determines, out of a plurality of UEs 50 predicted to be densely concentrated in a particular area, a UE 50 to be the target of communication timing control. For example, when the UE 50 is a UE that periodically transmits information, the communication timing control may be control for causing the mobile station to reduce the number of times of establishing communication, by causing the mobile station to reduce the frequency of transmitting information, or to lengthen the intervals between information transmissions. It goes without saying that the communication timing control may be control that causes the mobile station to increase the number of times of establishing communication.

Further, for example, in the case where a plurality of machine terminals that are managed as a group are set to perform communication at the same time, the communication timing control may mean exertion of control such that the communication timing is varied among the machine terminals.

In this manner, by exerting the communication timing control, the number of times in which a plurality of UEs 50 are connected to the eNB 60 for performing communication can be reduced. Therefore, the number of connections of the UE 50 to the eNB 60 is prevented from exceeding the allowed number, and the processing load of the eNB 60 can be reduced.

The mobile station concentration prediction unit 10 collects location information on a plurality of UEs 50 located in the mobile communication network via the MTC-IWF communication unit 92. The mobile station concentration prediction unit 10 may collect location information on a plurality of UEs 50 upon receipt of a message, transmitted from the AS 100 via the AS communication unit 91, that requests prediction of the area where the UEs 50 will be densely concentrated.

For example, the location information may be information relating to a base station including an eNB 60 to which a UE 50 is connected. Base stations including eNBs 60 are generally arranged at intervals of several hundred meters to several kilometers. Therefore, by collecting information relating to the base station to which a UE 50 is connected, the rough location of the UE 50 can be specified. Alternatively, the location information may be location information of a UE 50 measured through use of GPS. When the mobile station concentration prediction unit 10 predicts the area where a plurality of mobile stations will be densely concentrated, the mobile station concentration prediction unit 10 outputs the prediction result to the communication timing control unit 20.

When the prediction result predicting the area where a plurality of mobile stations will be densely concentrated is output from the mobile station concentration prediction unit 10, the communication timing control unit 20 determines the UE 50 whose communication timing is to be controlled. Here, the UE 50 whose communication timing is to be controlled may be determined based on a predetermined communication control policy.

For example, the communication timing control unit 20 may receive a communication control policy transmitted from the AS 100 via the AS communication unit 91. The communication control policy may include a method for determining the UE 50 whose communication timing is to be controlled and information as to what communication timing control is to be exerted.

For example, as to the UE 50 to be the target of the communication timing control, the communication timing control may be exerted on the UE 50 that is extracted on a random basis out of a plurality of UEs 50 belonging to an identical group. Alternatively, in the case where priorities are assigned to the plurality of UEs 50 belonging to the identical group, the communication timing control may be exerted on the UE 50 having a low priority. Alternatively, in the case where the time point at which each UE 50 belonging to the identical group has connected to the eNB 60 is specified, the communication timing control may be exerted in an order starting with the latest time point at which the UEs 50 connected to the eNB 60. Alternatively, a predetermined number of the UEs 50 may be arbitrarily selected out of a plurality of UEs 50 moving into the area where concentration of the UEs 50 is predicted. Alternatively, the communication control policy may include information of the UE 50 to which exertion of the communication timing control is prohibited, and the communication timing control may be exerted to the UEs except for the UE 50 to which exertion of the communication timing control is prohibited.

Further, the communication timing control unit 20 may select a machine terminal as the UE 50 to be the target of the communication timing control, and may not exert the communication timing control on another terminal (non-machine terminal). Basically, a machine terminal autonomously performs communication without information input by the user. Therefore, the number of times of communication of a machine terminal is generally smaller than that of a non-machine terminal. Therefore, as compared to the case where the communication timing control is exerted on a non-machine terminal, exertion of the communication timing control on a machine terminal can suppress a reduction in quality of the UE 50.

When the communication timing control unit 20 determines the UE 50 to be the target of the communication timing control and the content of the communication timing control, the communication timing control unit 20 transmits a terminal control request message including the determined information to the MTC-IWF 80. The communication timing control unit 20 transmits the terminal control request message to the MTC-IWF 80 via the MTC-IWF communication unit 92.

Figure 4:
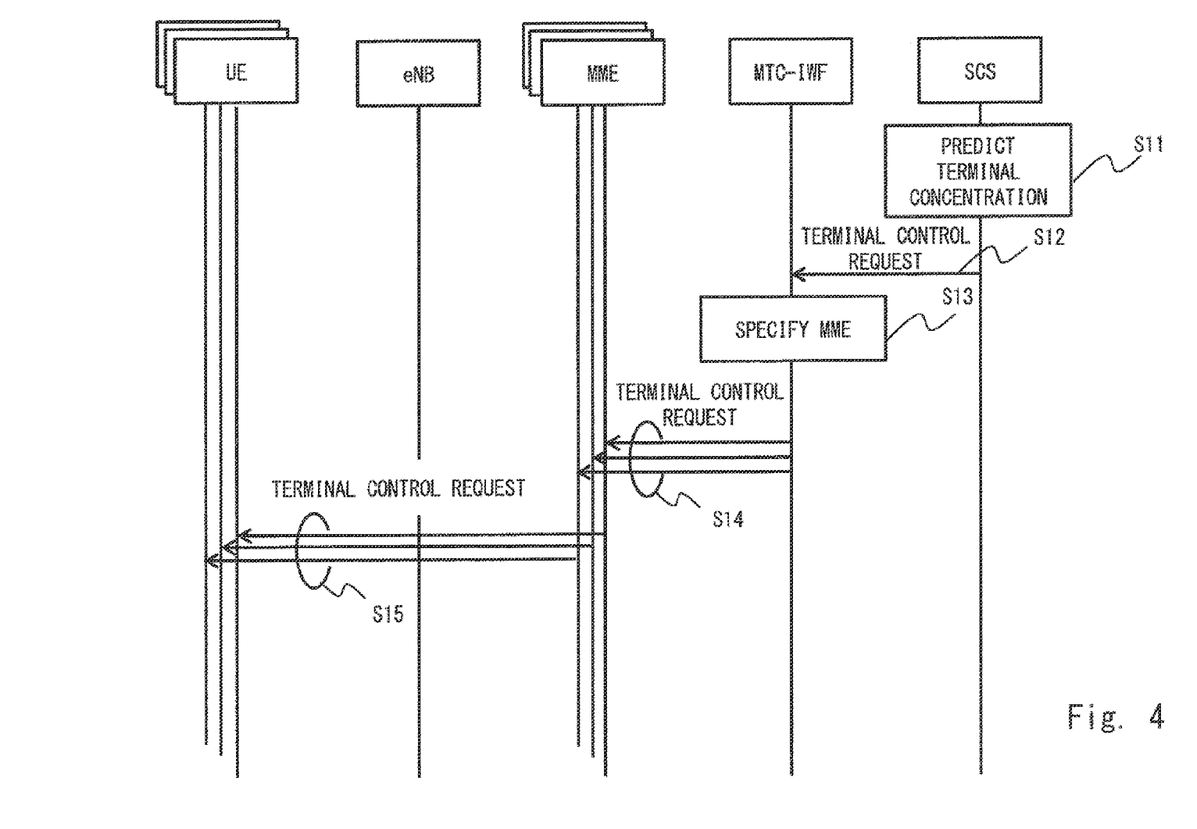
FIG. 4 is a diagram showing the flow of a process of exerting communication timing control according to the second embodiment.

Next, with reference to FIG. 4, a description will be given of the flow of a process of exerting the communication timing control according to the second embodiment of the present invention. Firstly, the mobile station concentration prediction unit 10 of the SCS 90 predicts an area where a plurality of UEs 50 will be densely concentrated (S11).

Next, the MTC-IWF communication unit 92 of the SCS 90 transmits a terminal control request message to the MTC-IWF 80 (S12). Specifically, the MTC-IWF communication unit 92 transmits, to the MTC-IWF 80, a terminal control request message in which an identifier of a terminal to be the target of the communication timing control (terminal ID) and the content of communication control timing are set.

Next, the MTC-IWF 80 specifies the MME 70 that is managing the UE 50 to be the target of the communication timing control (S13). For example, the MTC-IWF 80 may collect information of respective managed UEs 50 from all the MMEs arranged in the mobile communication network, to specify the MME 70 that manages the UE 50 to be the target of the communication timing control. Alternatively, the MTC-IWF 80 may transmit information relating to the UE 50 to be the target of the communication timing control to all the MMEs arranged in the mobile communication network. Then, by receiving a response message from the MME 70 managing the target UE 50, the MTC-IWF 80 may specify the MME 70 that is managing the UE 50 to be the target of the communication timing control. Alternatively, the MTC-IWF 80 may specify the MME 70 that is managing the UE to be the target of the communication timing control, through use of a subscriber information management apparatus or the like, such as an HSS that manages subscriber information.

Further, in the case where a plurality of UEs 50 each of which is to be the target of the communication timing control are managed by separate MMEs 70, the MTC-IWF 80 transmits a terminal control request message to each of the MMEs 70 (S14). Still further, when each of the MMEs 70 receives the terminal control request message from the MTC-IWF 80, each MME 70 transmits a terminal control request message to the UE 50 specified as the communication timing controlled target UE 50 (S15). FIG. 4 shows an example where each of the MMEs 70 transmits the terminal control request message using the interface that is established between the MME 70 and the UE 50. For example, the MME 70 may transmit the terminal control request message to the UE 50 using the NAS protocol.

In the present drawing, before a plurality of UEs 50 moves into the area where SCS 90 predicts that the plurality of UEs 50 will be densely concentrated, the communication timing control is exerted via the eNBs 60 that respectively form areas where the UEs 50 are currently located.

Figure 5:
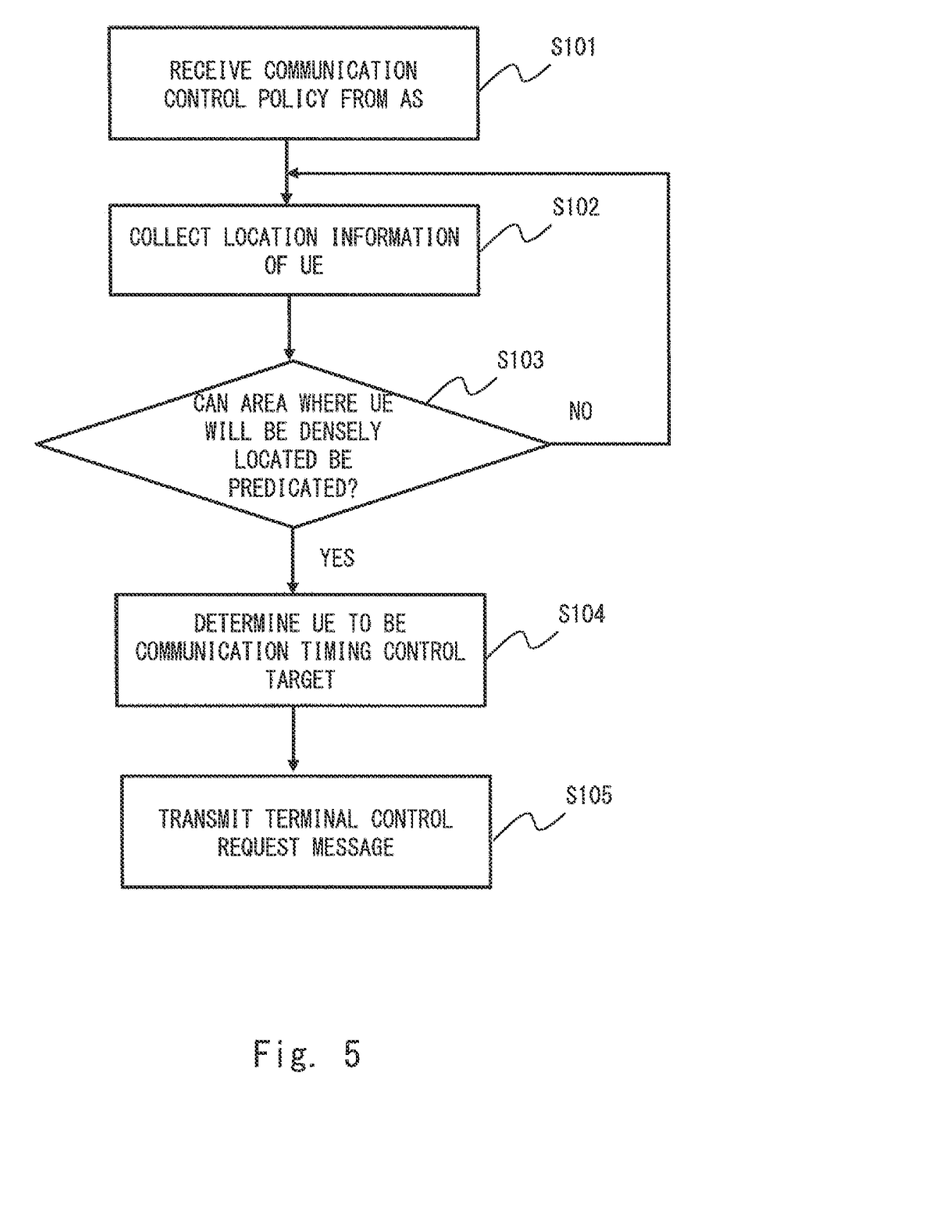
FIG. 5 is a diagram showing the flow of a terminal control request message transmission process according to the second embodiment.

Subsequently, with reference to FIG. 5, a description will be given of the flow of a process of transmitting the terminal control request message at the SCS 90 according to the second embodiment of the present invention.

Firstly, the mobile station concentration prediction unit 10 receives, from the AS 100, information relating to a communication control policy (S101). Next, the mobile station concentration prediction unit 10 collects location information on a plurality of UEs 50 (S102). As described above, the location information may be information relating to the eNBs 60 to which the UEs 50 are connected. Further, the mobile station concentration prediction unit 10 may periodically collect location information on the plurality of UEs 50. The mobile station concentration prediction unit 10 can grasp the movement history of each UE 50 by periodically collecting the location information. By grasping the movement history of the UE 50, the location or the like of the UE 50 after a lapse of a prescribed time can be predicted.

Next, the mobile station concentration prediction unit 10 determines, based on the collected location information, whether or not an area where the plurality of UEs 50 will be densely concentrated can be predicted (S103). When the mobile station concentration prediction unit 10 determines that the area where the plurality of UEs 50 will be densely concentrated cannot be predicted, the mobile station concentration prediction unit 10 repeats the process of Step S102 and collects location information of the UEs 50.

When the mobile station concentration prediction unit 10 determines that the area where the plurality of UEs 50 will be densely concentrated can be predicted, the communication timing control unit 20 determines the UE 50 to be the target of communication timing control (S104). The communication timing control unit 20 may determine the UE 50 to be the target of the communication timing control based on the communication control policy transmitted from the AS 100.

Next, the communication timing control unit 20 transmits, to the MTC-IWF 80, a terminal control request message relating to the determined UE 50 (S105).

As described above, by using the communication control system according to the second embodiment of the present invention, the communication timing control can be exerted on a mobile station also in the network defined in the 3GPP. Thus, the processing load of the eNB 60 connected to the UE 50 can be reduced.

Third Embodiment

Figure 6:
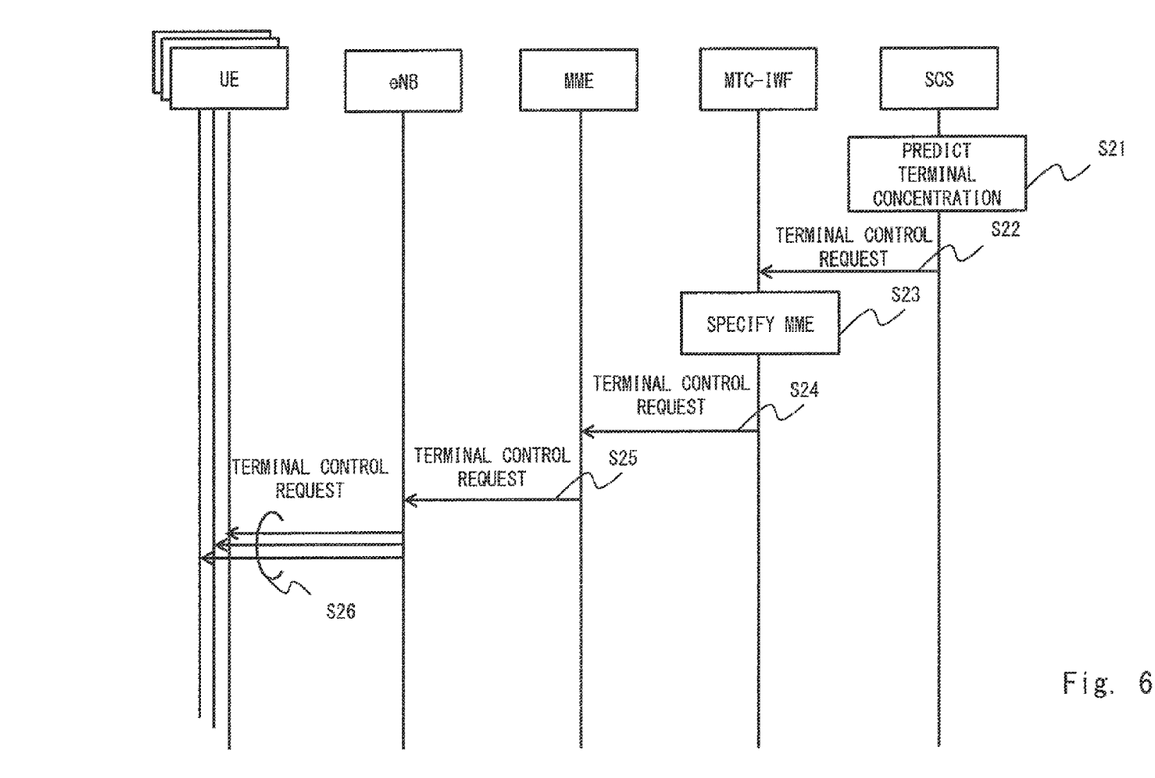
FIG. 6 is a diagram showing the flow of a process of exerting communication timing control according to a third embodiment.

Subsequently, with reference to FIG. 6, a description will be given of the flow of a process of exerting communication timing control according to a third embodiment of the present invention. Since Steps S21 to S24 are similar to Steps S11 to S14 in FIG. 4, the detailed description thereof is not repeated. Note that, in Step S14 in FIG. 4, the MTC-IWF 80 transmits a terminal control request message to a plurality of MMEs 70. In contrast, in Step S24 of the present drawing, the MTC-IWF 80 transmits a terminal control request message to a single MME 70 on the assumption that a plurality of UEs 50 to be the targets of the communication timing control are managed by a single MME 70.

When the MME 70 receives the terminal control request message from the MTC-IWF 80, the MME 70 transmits a terminal control request message to the eNB 60 where a plurality of UEs 50 which are the targets of the communication timing control (S25) are located. Next, the eNB 60 transmits a terminal control request message to a plurality of UEs 50 that are located in a cell formed by the eNB 60 and that are the targets of the communication timing control (S26). Here, the eNB 60 may transmit the terminal control request message using cell broadcast (CBS) as a broadcast communication system to the plurality of UEs 50 which are the targets of the communication timing control. The present drawing shows the exemplary case where, after the plurality of UEs 50 have moved into the area where a concentration of the UEs 50 had been predicted by the SCS 90, the communication timing control is exerted on the UEs 50.

As described above, in the communication control system according to the third embodiment of the present invention, the communication timing control is exerted on a plurality of UEs 50 located in the area predicted by the SCS 90. In the second embodiment, before the UEs 50 determined to be the targets of the communication timing control move into the area predicted by the SCS 90, the communication terminal control is exerted via the currently connected eNBs 60. In contrast, according to the third embodiment, after a plurality of UEs 50 determined to be the targets of the communication timing control have moved into the area predicted by the SCS 90, the communication timing control can be exerted at once on all the targets using cell broadcast. This can reduce the number of apparatuses among which terminal control request messages propagate in the mobile communication network. Therefore, as compared to the control according to the second embodiment, the load of the entire mobile communication network can be reduced.

Fourth Embodiment

Figure 7:
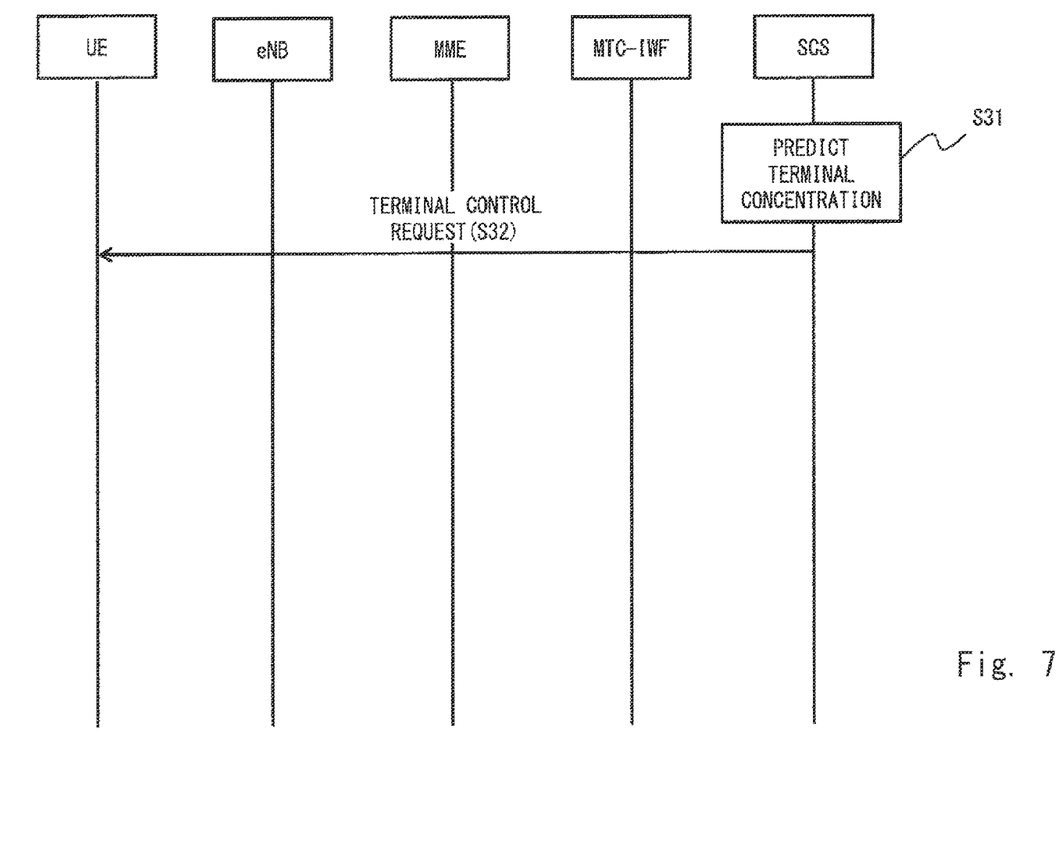
FIG. 7 is a diagram showing the flow of a process of exerting communication timing control according to a fourth embodiment.

Subsequently, with reference to FIG. 7, a description will be given of the flow of a process of exerting communication timing control according to a fourth embodiment of the present invention. Since Step S31 is similar to Step S11 in FIG. 4, the detailed description thereof is not repeated.

Next, when the SCS 90 has predicted the area where the plurality of UEs 50 would be densely concentrated, and further determines the UE 50 to be the target of the communication timing control, the SCS 90 transmits a terminal control request message to the determined UE 50 (S32). Here, the SCS 90 transmits the terminal control request message to the UE 50 using application data. For example, the SCS 90 may transmit the terminal control request message to the UE 50 using OMA-DM.

As described above, by transmitting a terminal control request message to the UE 50 from the SCS 90 using application data, the eNB 60, the MME 70, the MTC-IWF 80 and the like are not required to terminate the terminal control request message to perform ??the process??. Accordingly, also in the case where the terminal control request message is defined as a new message, it is not necessary to add functions to the eNB 60, the MME 70, the MTC-IWF 80 and the like. Thus, when the present invention is applied to the network defined in the 3GPP, functions may be added only to the UE 50 and the SCS 90, and changes to be made to the apparatuses can be reduced.

Fifth Embodiment

Figure 8:
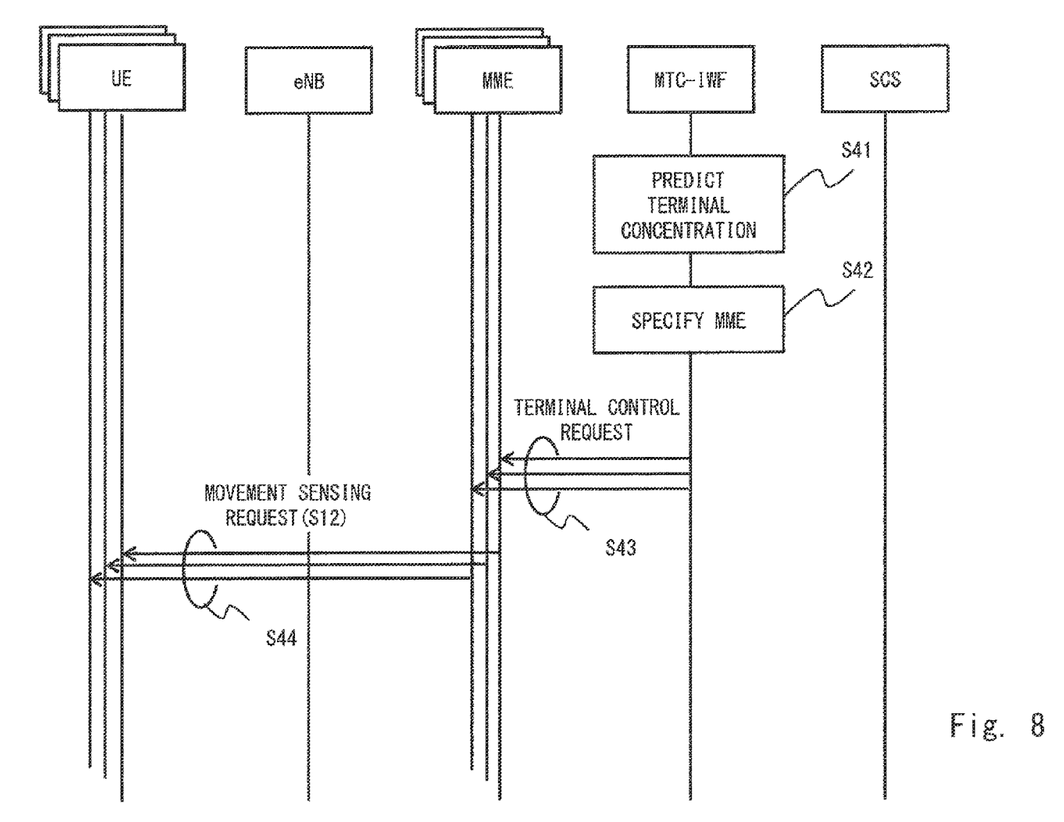
FIG. 8 is a diagram showing the flow of a process of exerting communication timing control according to a fifth embodiment.

Next, with reference to FIG. 8, a description will be given of the flow of a process of exerting communication timing control according to a fifth embodiment of the present invention. The process of predicting the area where a plurality of UEs 50 will be densely concentrated by the SCS 90 in FIGS. 4, 6 and 7 is executed by the MTC-IWF 80 in FIG. 8 (S41). Further, the MTC-IWF 80 determines the UEs 50 to be the targets of the communication timing control, and performs a process of specifying the eNB 60 that manages the determined UEs 50 (S42). Accordingly, in contrast to the process shown in FIGS. 4 and 6, the step of transmitting a terminal control request message from the SCS 90 to the MTC-IWF 80 can be eliminated. The processes in Steps S42 to S44 are similar to those in Steps S13 to S15 in FIG. 4 and, therefore, the detailed description thereof is not repeated.

Further, in determining the UEs 50 to be the targets of the communication timing control in Step S42, it is also possible to determine the UEs 50 to be the targets of the communication timing control based on the communication control policy transmitted from the SCS 90. For example, in Step S41, when the area where a plurality of UEs will be densely concentrated is predicted, information relating to the UEs moving into the area may be reported to the SCS 90, and the SCS 90 may report the information as to which UEs 50 are the targets of communication timing control to the MTC-IWF 80. Alternatively, the MTC-IWF 80 may previously acquire, from the SCS 90, information relating to the UEs 50 to which exertion of the communication timing control is prohibited, and perform the communication timing control on the UEs except for such prohibited UEs 50.

As described above, by using the process flow of exerting the communication timing control according to the fifth embodiment of the present invention, the MTC-IWF 80 can predict the area where a plurality of UEs 50 will be densely concentrated. Accordingly, as compared to the cases described with reference to FIGS. 4 and 6, the steps of transmitting signals between the SCS 90 and the MTC-IWF 80 can be reduced. Thus, the number of signals transmitted in the entire network can be reduced.

Note that, the present invention is not limited to the embodiments above, and can be modified as appropriate within the range not departing from the gist of the present invention.

The present invention has been described as hardware configurations in the embodiments above. However, the present invention is not limited thereto. The process shown in FIG. 5 can be realized by causing a CPU (Central Processing Unit) to execute a computer program. In this case, the computer program is stored using a non-transitory computer readable medium (non-transitory computer readable medium) of various types, to be provided to a computer. The non-transitory computer readable medium includes a tangible storage medium (tangible storage medium) of various types. Examples of the non-transitory computer readable medium include magnetic recording medium (e.g., a floppy disk, a magnetic tape, a hard disk drive), a magneto-optical recording medium (e.g., a magneto-optical disk), CD-ROM (Read Only Memory), CD-R, CD-R/W, a semiconductor memory (e.g., mask ROM, PROM (Programmable ROM), EPROM (Erasable PROM), flash ROM, and RAM (random access memory)). Further, the program may be provided to a computer using a transitory computer readable medium (transitory computer readable medium) of various types. Examples of the transitory computer readable medium include electric signals, optical signals, and electromagnetic waves. The transitory computer readable medium can provide the program to the computer via a wired communication line such as an electric wire and optical fibers or a wireless communication line.

Though the present invention has been described above with reference to the embodiments, the present invention is not limited thereby. The configuration and details of the present invention can be modified in various manners which can be understood by a person skilled in the art within the scope of the present invention.

This application is based upon and claims the benefit of priority from Japanese patent application No. 2012-260719 filed on Nov. 29, 2012, the disclosure of which is incorporated herein in its entirety by reference.

REFERENCE SIGNS LIST 10 mobile station concentration prediction unit
20 communication timing control unit
31 to 34 mobile stations
40 area
50 UE
60 eNB
70 MME
80 MTC-IWF
90 SCS
91 AS communication unit
92 MTC-IWF communication unit
100 AS

The invention claimed is:

1. A communication control system comprising:
a mobile station concentration prediction unit that predicts an area where a plurality of mobile stations will be densely concentrated by movement of the plurality of mobile stations; and
a communication timing control unit that determines a mobile station to be a communication timing controlled target out of the plurality of mobile stations predicted to be densely concentrated in the area, and controlling communication timing of the determined mobile station,
wherein:
the plurality of mobile stations includes a machine terminal that autonomously performs communication without requiring a user's operation, and a non-machine terminal that performs communication based on operation information input by the user, and
the communication timing control unit controls communication timing of the machine terminal and reduces a number of times of the machine terminal being connected to a base station for performing communication.

2. The communication control system according to claim 1, wherein, when the plurality of mobile stations include a plurality of mobile stations belonging to an identical group, the communication timing control unit determines the mobile station to be the communication timing controlled target out of the plurality of mobile stations belonging to the identical group.

3. The communication control system according to claim 1, wherein the communication timing control unit changes a communication interval of the mobile station to be the communication timing controlled target.

4. The communication control system according to claim 1, wherein the communication timing control unit reduces a number of times of the mobile station to be the communication timing controlled target connected to a base station for performing communication.

5. The communication control system according to claim 1, wherein the communication timing control unit controls the communication timing of the determined mobile station via a base station in an area of which the determined mobile station is currently located.

6. The communication control system according to claim 1, wherein the communication timing control unit controls the communication timing of the determined mobile station via a base station that forms an area where the mobile stations are densely concentrated.

7. The communication control system according to claim 1, wherein the mobile station concentration prediction unit collects movement histories of the plurality of mobile stations, and predicts an area where the plurality of mobile stations will be densely concentrated by statistically processing the collected movement histories.

8. A service management server that is arranged between a network apparatus arranged in a mobile communication network and an application server arranged in an external communication network, the service management server comprising:
a mobile station concentration prediction unit that predicts an area where a plurality of mobile stations will be densely concentrated by movement of the plurality of mobile stations; and
a communication timing control unit that determines a mobile station to be a communication timing controlled target out of the plurality of mobile stations predicted to be densely concentrated in the area, and controlling communication timing of the determined mobile station,
wherein:
the plurality of mobile stations includes a machine terminal that autonomously performs communication without requiring a user's operation, and a non-machine terminal that performs communication based on operation information input by the user, and
the communication timing control unit controls communication timing of the machine terminal and reduces a number of times of the machine terminal being connected to a base station for performing communication.

9. The service management server according to claim 8, wherein, when the plurality of mobile stations include a plurality of mobile stations belonging to an identical group, the communication timing control unit determines the mobile station to be the communication timing controlled target out of the plurality of mobile stations belonging to the identical group.

10. The service management server according to claim 8, wherein the communication timing control unit changes a communication interval of the mobile station to be the communication timing controlled target.

11. The service management server according to claim 8, wherein the communication timing control unit reduces a number of times of the mobile station to be the communication timing controlled target being connected to a base station for performing communication.

12. The service management server according to claim 8, wherein the communication timing control unit controls the communication timing of the determined mobile station via a base station in an area of which the determined mobile station is currently located.

13. The service management server according to claim 8, wherein the communication timing control unit controls the communication timing of the determined mobile station via a base station that forms an area where the mobile stations are densely concentrated.

14. The service management server according to claim 8, wherein the mobile station concentration prediction unit collects movement histories of the plurality of mobile stations, and predicts an area where the plurality of mobile stations will be densely concentrated by statistically processing the collected movement histories.

15. A mobile station comprising:
a receiver that receives a terminal control request message transmitted from a service management server predicting an area where a plurality of mobile stations will be densely concentrated by movement of the plurality of mobile stations, the plurality of mobile stations including a machine terminal that autonomously performs communication without requiring a user's operation and a non-machine terminal that performs communication based on operation information input by the user, the service management server controlling communication timing of the determined mobile station and reducing a number of times of the machine terminal being connected to a base station for performing communication, and
a transmitter that changes the communication timing based on the terminal control request message.

16. A communication control method comprising:
predicting an area where a plurality of mobile stations will be densely concentrated by movement of the plurality of mobile stations, the plurality of mobile stations including a machine terminal that autonomously performs communication without requiring a user's operation, and a non-machine terminal that performs communication based on operation information input by the user;
determining a mobile station to be a communication timing controlled target out of the plurality of mobile stations predicted to be densely concentrated in the area;
controlling communication timing of the determined mobile station; and
reducing a number of times of the machine terminal being connected to a base station for performing communication.

17. A non-transitory computer readable medium that stores a program for causing a computer to execute the steps of:
predicting an area where a plurality of mobile stations will be densely concentrated by movement of the plurality of mobile stations, the plurality of mobile stations including a machine terminal that autonomously performs communication without requiring a user's operation, and a non-machine terminal that performs communication based on operation information input by the user;
determining a mobile station to be a communication timing controlled target out of the plurality of mobile stations predicted to be densely concentrated in the area;
controlling communication timing of the determined mobile station; and
reducing a number of times of the machine terminal being connected to a base station for performing communication.

* * * * *